(No Model.)
O. P. HIX.
CAR BRAKE.
No. 508,109. Patented Nov. 7, 1893.
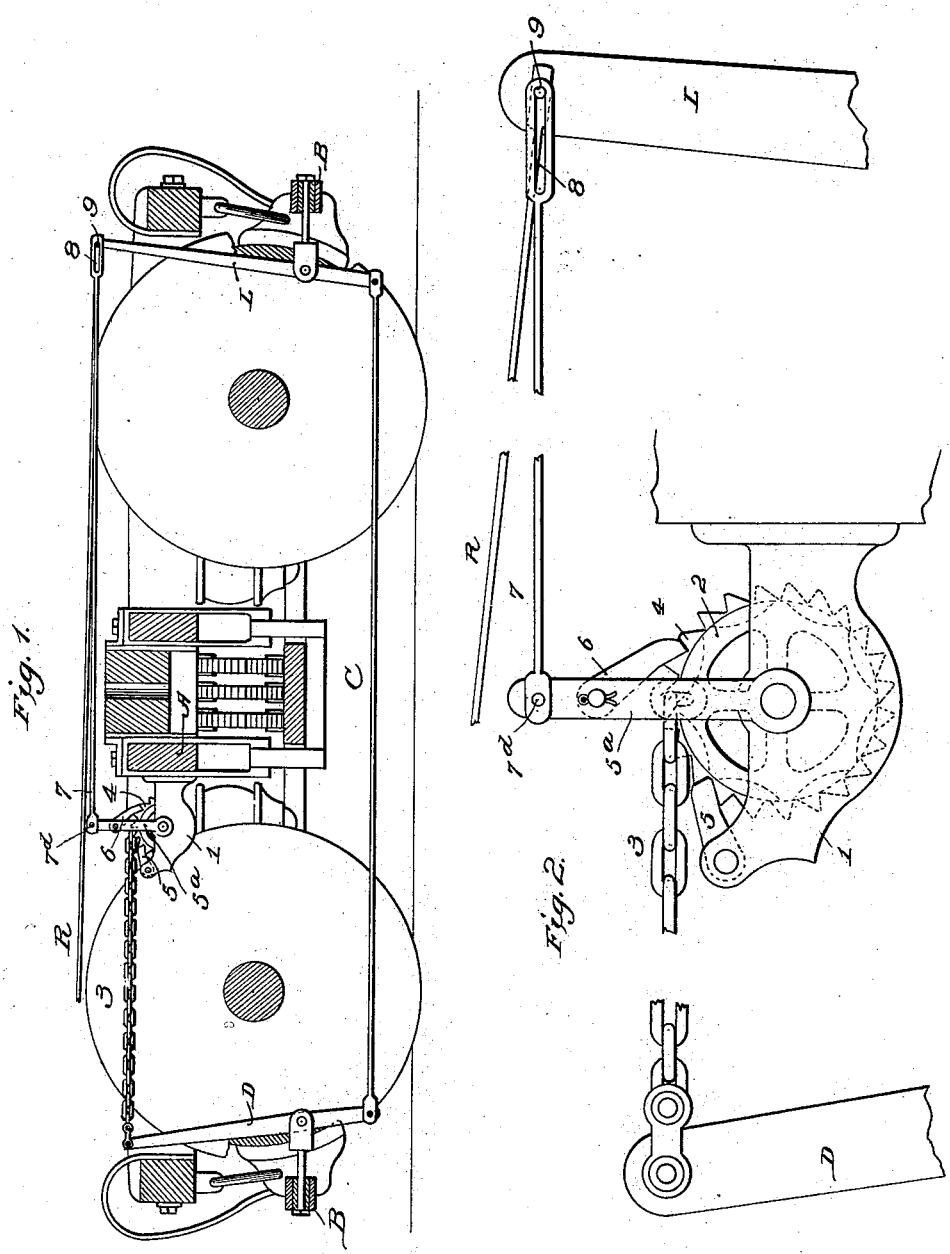
Witnesses:
Harry S. Rohrer.
Wm. E. Dyre.
Inventor:
Oliver P. Hix
By F. W. Ritter Jr.
Attorney.

UNITED STATES PATENT OFFICE.

OLIVER P. HIX, OF ROCKLAND, MAINE, ASSIGNOR TO THE CONSOLIDATED BRAKE ADJUSTER COMPANY, OF CHICAGO, ILLINOIS.

CAR-BRAKE.

SPECIFICATION forming part of Letters Patent No. 508,109, dated November 7, 1893.

Application filed March 13, 1893. Serial No. 465,781. (No model.)

*To all whom it may concern:*

Be it known that I, OLIVER P. HIX, residing at Rockland, in the county of Knox and State of Maine, have invented certain new and useful Improvements in Slack Adjusters for Brakes; and I hereby declare the following to be a full, clear, and exact description of the same, reference being had to the accompanying drawings, in which—

Figure 1, is an elevation of a slack adjuster mechanism embodying my invention together with so much of a truck, and wheels as is necessary to illustrate the attachment and operation of the devices when applied to outside brakes. Fig. 2 is an enlarged detached view of the devices embodying my invention—parts being broken away.

Like symbols refer to like parts wherever they occur.

My invention relates to the construction of that class of mechanism termed "slack adjusters" used in conjunction with brake mechanism to compensate for the wear of the brake shoes, to automatically take up lost motion in the system, and thus insure at all times the effective operation of the brakes. In the case of air, steam, or like, power applied brakes, where a limited range of motion exists, it becomes essential to the effective operation of the brakes that the predetermined distance between the wheels and the brake shoes—when the brakes are off—be maintained, so that the brakes shall be effectively applied by a given stroke of the piston, or movement of the brake levers. In order to accomplish this the slack must be taken up as it occurs and before it becomes excessive. It is not only desirable that the mechanism employed for the purpose should be simple, so as to be within the comprehension and care of unskilled labor—but it should be of a character to take up the slack on the release of the brakes and not on the application of the brakes for in the latter case there is a tendency to gradually diminish the normal distance between the wheel and shoe with increased wear and liability to jam the brakes and slide the wheels.

The object, therefore, of the present invention is the production of simple and efficient mechanism for taking up the slack on the release of the brakes.

The invention, generally stated, embraces, the combination with the live and dead levers of a brake system, of a pawl and ratchet mechanism, a flexible connection, and a slotted adjuster rod for actuating the pawl and ratchet mechanism on the release of the brakes—all substantially as will hereinafter more fully appear.

In the drawings A indicates the truck bolster; B, B, the brake beams, which are suspended by suitable hangers; C the connecting rod; D the dead lever, and L the live lever, all of which may be of any approved form.

Secured to the bolster A or to other convenient part of the truck and in proper relation to the dead lever D—is a bracket 1 in which is journaled the shaft of a drum 2 said drum being connected with the dead lever D by a chain or like flexible connection 3, one end of the flexible connection 3 being secured to the drum so as to be wound thereon when the drum revolves, and the opposite end connected with the dead lever D so as to cause the gradual change of position thereof responsive to the movement of said drum. Either formed on the periphery of the drum or attached to the shaft thereof as may be preferred is a ratchet wheel 4 with which engages a fixed or holding dog or pawl 5 pivoted on the bracket 1 so as to prevent the rotation of the drum 3 in one direction. Pivoted on the bracket 1 and straddling the ratchet wheel 4 is an oscillating yoke $5^a$ in which is journaled or pivoted an active pawl or dog 6, and said yoke is connected with the live lever L by a yoke operating rod 7. The yoke operating rod 7 is pivoted to the yoke 5 as at $7^d$ and the opposite end—or that by which it connects with the live lever L is provided with a slot 8 equal in length to the "normal" movement of that end of the live lever in applying the brakes. Through said slot 8 passes the pin 9 which serves as the connection between the live lever and operating rod 7—and said pin 9 also forms the connection between the pull rod—or rod R which connects with the piston or other source of power, so that so long as the live lever L has only its "normal" movement in applying the brakes there will be no longitudinal motion of the yoke operating rod 7 and the adjuster mechanism will be at rest.

The devices being of the general character and combined substantially as specified, will operate as follows—The brake system having been first adjusted so that the brakes when off stand at the predetermined distance from the wheels corresponding with the desired amount of movement of the rod R (or power) required to apply the brakes, and said distance being also proportioned to the length of slot 8 in yoke operating rod 7—there will be no movement of the brake adjuster mechanism so long as there is no material wear of the brake shoes or slack in the brake system. When however wear takes place or slack occurs, the rod R will have a gradually increasing or "excessive" travel in applying the brakes. This will bring pin 9 in contact with the inner end of slot 8 giving said rod 7 a longitudinal movement which will cause said rod to oscillate yoke 5 until pawl 6 rides back over another tooth of the ratchet wheel 4. All this occurs during the application of the brakes. When the braking power is withdrawn and the brakes released, they are as usual taken off by the springs or equivalent means employed for such purpose, and in their movement away from the wheels the pin 9 traverses slot 8 and abutting against the outer end of said slot draws the rod 7 in reverse direction and through the medium of oscillatory yoke 5 and pawl 6 imparts a slight rotatory motion to drum 2 which winds up enough of flexible connection 3 to move the upper end of dead lever D sufficiently to compensate (by change of position of the fulcrum) for the wear upon the brake shoe, or lost motion in the brake system.

In case it is desired to apply the mechanism to inside hung brakes no change of construction is necessary; all that will be required being to reverse the mechanism in manner well known to the skilled in this class of devices.

Among the advantages of my invention are simplicity, effectiveness in operation, non liability to become clogged or get out of order, and the taking up of the slack or wear on the release movement of the brakes.

Having thus described my invention, what I claim, and desire to secure by Letters Patent, is—

1. In a slack adjuster for brakes, the combination with the brake levers, of a rotary shaft or drum, a ratchet wheel, an oscillating pawl, and a pawl rod having a slotted connection with one of said brake levers; substantially as and for the purposes specified.

2. In a slack adjuster for brakes, the combination with the brake levers, of a rotary shaft or drum, a ratchet wheel, a fixed pawl, an oscillating yoke provided with an active pawl which engages the ratchet wheel, and a pawl rod having a slot and pin connection with one of the said brake levers; substantially as and for the purposes specified.

3. In a slack adjuster, the combination with the live and dead levers, of a rotary drum, a ratchet wheel and fixed pawl, an oscillating yoke and active pawl, a pawl rod having a slot and pin connection with the live lever, and a flexible connection between the drum and the dead lever; substantially as and for the purposes specified.

4. In a slack adjuster, the combination with the live and dead levers, of a drum, a flexible connection between the drum and dead lever, a ratchet wheel and fixed pawl, an oscillating yoke and active pawl, a pawl rod slotted at the end which connects with the live lever, a power rod, and a pivot pin common to both the power rod and pawl rod; substantially as and for the purposes specified.

5. In a slack adjuster, the combination with the dead and live levers, of a rotary drum, a connection between said drum and the dead lever, a pawl and ratchet mechanism, a slotted pawl rod, a power rod, and a pivot pin on the live lever which forms a common connection therewith for the power rod and pawl rod; substantially as and for the purposes specified.

In testimony whereof I affix my signature, in presence of two witnesses, this 2d day of March, 1893.

OLIVER P. HIX.

Witnesses:
GEO. H. BRYANT,
JNO. W. CARRINGTON, Jr.